US010353757B2

(12) United States Patent
Martin et al.

(10) Patent No.: US 10,353,757 B2
(45) Date of Patent: Jul. 16, 2019

(54) METHOD FOR PROCESSING VEHICLE-TO-X MESSAGES

(71) Applicant: Continental Teves AG & Co. oHG, Frankfurt (DE)

(72) Inventors: Torsten Martin, Steinbach/Taunus (DE); Marc Menzel, Weimar (DE); Richard Scherping, Liederbach am Taunus (DE); Ulrich Stählin, Eschborn (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 211 days.

(21) Appl. No.: 15/642,421

(22) Filed: Jul. 6, 2017

(65) Prior Publication Data

US 2018/0067789 A1 Mar. 8, 2018

(30) Foreign Application Priority Data

Sep. 8, 2016 (DE) .......................... 10 2016 217 100

(51) Int. Cl.
*G06F 9/54* (2006.01)
*G06F 13/16* (2006.01)
*G06F 21/60* (2013.01)
*H04W 4/12* (2009.01)
*H04W 12/00* (2009.01)
*H04W 4/40* (2018.01)
*H04W 12/10* (2009.01)
*G08G 1/16* (2006.01)

(52) U.S. Cl.
CPC .......... *G06F 9/546* (2013.01); *G06F 13/1673* (2013.01); *G06F 21/606* (2013.01); *H04W 4/12* (2013.01); *H04W 4/40* (2018.02); *H04W 12/00* (2013.01); *H04W 12/1006* (2019.01); *H04W 12/1008* (2019.01); *G06F 2213/16* (2013.01); *G08G 1/161* (2013.01); *G08G 1/164* (2013.01)

(58) Field of Classification Search
CPC .... G06F 9/546; G06F 21/606; G06F 13/1673; G06F 2213/16; H04W 4/40; H04W 12/1008; H04W 12/1006; H04W 12/00; H04W 4/12; G08G 1/161; G08G 1/164
See application file for complete search history.

(56) References Cited

U.S. PATENT DOCUMENTS

2016/0080517 A1 3/2016 Decker et al.

FOREIGN PATENT DOCUMENTS

DE 102010002092 A1 12/2010

OTHER PUBLICATIONS

Non Final Office Action for U.S. Appl. No. 15/672,534, dated Dec. 31, 2018, 13 pages.
Krishnan, H., "Verify-on-Demand"—A practical and scalable approach for broadcast authentication in vehicle safety communication, Oct. 2, 2008, pp. 1-10, IP.com No. IPCOM000175512D, XP013126503.
German Search Report for German Application No. 10 2016 217 100.3, dated Mar. 22, 2017, including partial English translation, 11 pages.

*Primary Examiner* — Ryan W Sherwin
(74) *Attorney, Agent, or Firm* — RatnerPrestia

(57) ABSTRACT

A method for processing vehicle-to-X messages in a processing module and a method for processing vehicle-to-X messages in a control module. In the course of this messages are checked in a specified checking sequence.

20 Claims, 1 Drawing Sheet

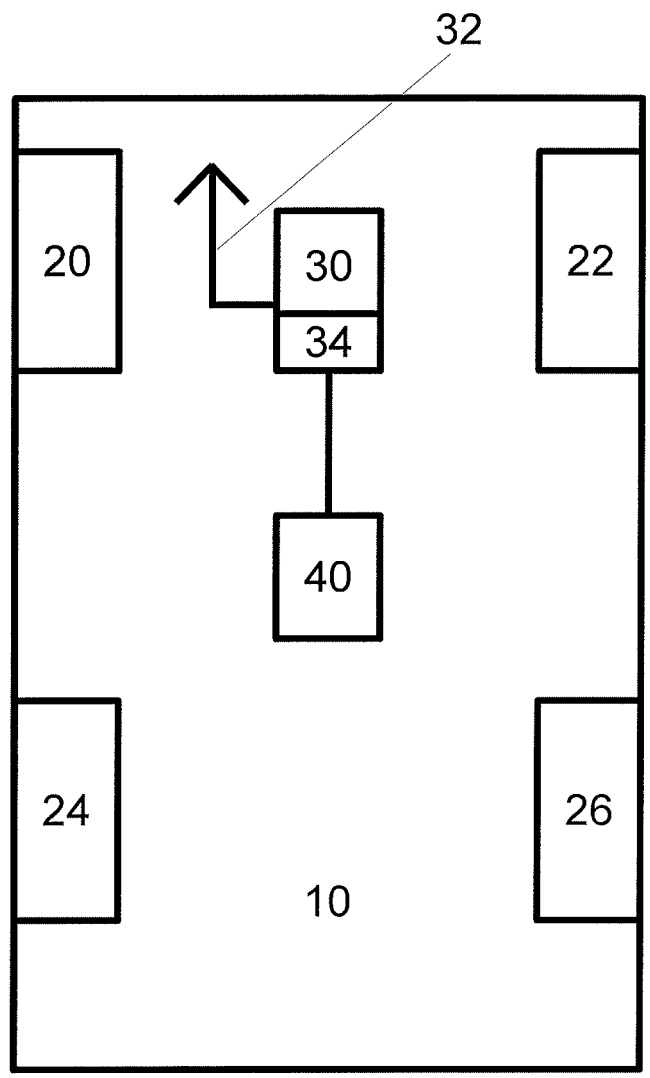

METHOD FOR PROCESSING VEHICLE-TO-X MESSAGES

CROSS REFERENCE TO RELATED APPLICATIONS

This application claims priority to German Patent Application 10 2016 217 100.3, filed Sep. 8, 2016, the contents of such application being incorporated by reference herein.

FIELD OF THE INVENTION

The invention relates to a method for processing vehicle-to-X messages in a processing module as well as a method for processing vehicle-to-X messages in a control module.

BACKGROUND OF THE INVENTION

Vehicle-to-X communication, also referred to as car-to-X communication or C2X or V2X communication for short, is the state of research or advance development and is currently being standardized. In particular, this can be based on the standard IEEE 802.11p.

Since this communication concerns communication which is of very critical importance for road traffic, it is typically necessary to safeguard it against tampering. In particular, a method can be used for this purpose in which the communication is made verifiable with the aid of cryptographic checksums. These checksums are typically based on asymmetric cryptography methods, for example ECDSA. As the basis of this verification, all of the approved vehicles together with the public keys used by them are registered by means of a central infrastructure which can also be referred to as a public key infrastructure (PKI).

As has been demonstrated, verifying all of the incoming messages or messages received by a vehicle requires a great deal of processing power, making appropriate solutions very expensive. Instead of this so-called "verify all" approach, the so-called "verification on demand" approach has therefore already been developed, in which only those messages are checked which are deemed important by applications or which are classified as important by another algorithm. Therefore, a "verification on demand" approach saves a significant amount of processing power compared to a "verify all" approach.

Typically, an attempt is made to structurally combine those elements which are absolutely necessary for the vehicle-to-X communication or where the vehicle-to-X communication differs from other solutions already present in the vehicle. These are mainly a transceiver and security support. The applications can, however, be housed in part in already existing control units.

However, such a dispersed method of construction causes difficulties in the case of the "verification on demand" approach since the decision as to whether a message is important is made in a control unit where the implementation of the security solutions or security is missing, as the latter is/are housed in the unit which is specific to the vehicle-to-X communication.

In addition, the known concepts do not utilize the available computing capacity in an ideal manner.

SUMMARY OF THE INVENTION

Therefore an aspect of the invention proposes measures which, in particular, facilitate and/or improve the implementation of security solutions in vehicle-to-X communication.

An aspect of the invention relates to a method for processing vehicle-to-X messages in a processing module. Such a processing module is typically a module in which incoming or received vehicle-to-X messages are present within a vehicle first of all or at a very early stage of the processing. In particular, during the receipt of vehicle-to-X messages, said processing module is typically upstream of the control module described further below if such a control module is used.

The process comprises the following steps:
receiving a quantity of vehicle-to-X messages,
storing the vehicle-to-X messages in a buffer memory,
specifying a checking sequence for the vehicle-to-X messages, and
performing a verification of the vehicle-to-X messages in accordance with the checking sequence.

Vehicle-to-X messages can be verified by means of this method in accordance with a predefined checking sequence. In the process, various information or parameters can, in particular, be considered, for example those which are dealt with in further detail below. As a result, results of verifications are available immediately when they are needed. Existing computing capacity can be advantageously used when using the method according to the invention since, in particular, at suitable time intervals or in the case of certain preconditions, messages can be verified according to their importance.

The checking sequence can, in particular, be specified on the basis of prioritization information. A suitable data base is therefore created for the specification so that different parameters can be taken into account. According to an advantageous embodiment, the method comprises the following step:
receiving a quantity of prioritization information for the stored vehicle-to-X messages, in particular from a control module.

As a result, a control module which, for example, receives the messages and further processes them for various applications can specify the prioritization information and thus influence the checking sequence.

According to an advantageous embodiment, the method comprises the following step:
specifying of the prioritization information by the processing module.

As a result, the processing module can itself specify the prioritization information and thus influence the checking sequence.

It is understood that the two embodiments just mentioned can also be combined.

The prioritization information can, in particular, indicate numerical and/or quantitative priority values for the vehicle-to-X messages, thus allowing simple processing.

According to an advantageous embodiment, the method further comprises the following step:
forwarding the vehicle-to-X messages to at least one control module.

Such a control module is typically a module which uses the vehicle-to-X messages within the framework of specific applications, for example for driving assistance systems or for safety systems.

According to an advantageous embodiment, the method further comprises the following step:
receiving a check request from the control module for at least one of the vehicle-to-X messages and, in response thereto, performing a verification of said vehicle-to-X message and sending a result of the verification to the control module.

It is thus possible to specifically verify those vehicle-to-X messages for which this is considered necessary by a control module. A control module is, in this case, typically a module which runs an application in which vehicle-to-X messages are processed.

In particular, this step makes it possible to verify a message which has not yet been verified within the framework of the verification described above, for example because it had not yet reached its turn for checking within the framework of the checking sequence.

As a result of storing the vehicle-to-X messages in the buffer memory, it is not necessary to send the vehicle-to-X message to be verified back from the control module to the processing module. Instead, it is sufficient to transmit substantially briefer information which is enough to identify the stored message.

It is understood that both during the storage of a vehicle-to-X message and during the forwarding of a vehicle-to-X message the particular vehicle-to-X message can both be completely stored or forwarded and can only be partially stored or forwarded. This will be dealt with in greater detail below.

According to a preferred embodiment, on receipt of a check request for a message which has already been verified a result of this verification is sent to the control module. It is therefore possible to have recourse to a verification which has already been performed, in particular during a phase of low system load, and a further verification with a corresponding time delay can be avoided. It is also possible to achieve a better utilization of the computing capacity of the processing module.

According to a preferred embodiment, the vehicle-to-X messages are forwarded without particular components to be detached, in particular security parts. The data traffic can therefore be further reduced, as only those parts of a particular vehicle-to-X message are forwarded to the control module which are also relevant to the control module. Security parts which are merely necessary for the verification can in this case typically be excluded from the forwarding.

An identifier for identifying the vehicle-to-X message is preferably saved for each message stored in the buffer memory. In this case, a particular check request typically contains a particular identifier of the vehicle-to-X message to be verified. This can significantly reduce the data traffic between the processing module and the control module, in particular when compared with a complete transmission of the message.

One component of the vehicle-to-X message can, in particular, be used as the identifier of a particular vehicle-to-X message. It is possible to have recourse to identifiers or components which are typically included in vehicle-to-X messages anyway for identification purposes. However, a separate identifier can also be generated and used accordingly.

According to a preferred embodiment, the method further comprises the following step:
  performing a pre-processing of the vehicle-to-X messages,
  wherein depending on the pre-processing only a part of the vehicle-to-X messages is stored and/or sent.

The quantity of the vehicle-to-X messages which are to be processed in any case, for example to be stored or to be sent, can typically be significantly reduced, since messages which are not important for the particular vehicle are sorted out within the framework of pre-processing.

According to a further development, the method further comprises the following steps:
  detecting a low system load of the processing module, wherein
  the verification of stored vehicle-to-X messages is performed in response to the detection of a low system load.

This makes it possible to utilize phases of low system load of the processing module, if the processing module is not already busy, for example performing other tasks. For example, a value of the processor utilization can be enlisted for the system load. It can be provided, for example, that this verification which is to take place in response to the low system load is triggered if the system load, i.e. for example a processor utilization, falls below a certain threshold or falls below a certain threshold for a predefined time.

According to a preferred embodiment, the method further comprises the following step:
  in response to the performance of a verification for a vehicle-to-X message, removing the vehicle-to-X message from the buffer memory.

Space can therefore be released in the buffer memory, in particular for those vehicle-to-X messages which have already been verified and for which further storage is therefore typically no longer necessary. In particular, vehicle-to-X messages which have already been forwarded can be removed. It is, for example, also possible to continue to store only one identifier and the result of the verification if the particular message is removed.

According to a further development, the method further comprises the following step:
  in response to the performance of a verification, immediately sending a result of the verification to the control module.

This makes it possible to further reduce the necessary steps if the control module classifies a message which has already been verified as necessary. In this case, the sending of the check request to the processing module can be dispensed with since the necessary result is already in the control module.

It is understood that the aforementioned steps (in particular temporary storage of results of the verification in the processing module as well as immediate sending of verification results) can, in each case, be implemented both individually and in combination.

In addition, the invention relates to a method for processing vehicle-to-X messages in a control module, which comprises the following steps:
  receiving a quantity of vehicle-to-X messages from a processing module,
  determining and sending the particular prioritization information for the vehicle-to-X messages to the processing module.

Prioritization information can therefore be created by the control module and made available to the processing module. As a result, the control module can influence the prioritization sequence. It can, for example, ensure that the messages which are particularly important for its applications are verified at an early stage.

The prioritization information determined by the control module can, in particular, be based on internal calculations or other algorithms which determine a relevance of a particular vehicle-to-X message to the control module. This can also concern the relevance of certain groups or types of vehicle-to-X messages. The processing module can therefore be supported in selecting messages which, during a verification, in response to a low system utilization or otherwise, are verified first or in order to specify an appropriate sequence. This makes it possible to verify the particularly relevant messages first so that those having a higher probability have already been verified, if a verification is required.

According to a preferred embodiment, the method further comprises the following step:

determining for each of the vehicle-to-X messages whether the particular vehicle-to-X message is to be verified and, in response to the fact that a particular vehicle-to-X message is to be verified, sending a check request for this vehicle-to-X message to the processing module.

In particular, this step accordingly corresponds to the method step mentioned above for verifying, in response to a check request, and indeed henceforth in the case of a control module.

A control module is, as already mentioned above, typically a module in which applications using vehicle-to-X messages are run. For example, this can be an autonomous driving function or a function for preventing collisions.

According to one embodiment, the method comprises the following step:

determining the prioritization information based on vehicle-to-X subscribers.

According to one embodiment, the method comprises the following step:

sending a check request based on vehicle-to-X subscribers to the processing module.

In particular, these steps support the fact that algorithms used in vehicle-to-X communication typically perform calculations based on objects which send vehicle-to-X messages. Such an object can, for example, be another vehicle in the surroundings or another vehicle-to-X subscriber. Vehicle-to-X messages typically include identification information, by means of which vehicle-to-X messages can be assigned to the particular vehicle-to-X subscribers.

The fact that the control module now establishes its feedback to the processing module on the basis of these object identifications means that the communication between the control module and the processing module can be further optimized because a single piece of prioritization information can potentially be used for multiple vehicle-to-X messages.

In addition, the processing module can automatically adopt such a piece of prioritization information for all of the other vehicle-to-X messages which are received from the same vehicle-to-X subscriber, without the need for additional updating by the control module.

As a result of the exchange of prioritization information and check requests based on an identification of the vehicle-to-X subscribers, which identifies all of the associated vehicle-to-X messages (including those which have not yet been received), a particular simplification can be achieved.

A control module can, as described, decide itself for which messages a verification is displayed due to the critical nature thereof and accordingly trigger a verification by sending a check request for this vehicle-to-X message and/or guarantee an early verification by generating prioritization information.

According to a preferred embodiment, the method further comprises the following step:

performing a decoding, in particular an ASN.1 decoding, for the vehicle-to-X messages.

It should be noted that this step is, in particular, advantageously performed in the control module and not in the verification module as it is not typically necessary for the verification. Therefore, one step of the decoding, in particular ASN.1 decoding, is advantageously not performed for the vehicle-to-X messages in the processing module. It is, however, understood that it is generally also possible to perform such a decoding step in the processing module.

According to a preferred embodiment, the method further comprises the following step:

receiving particular results of the verification for the vehicle-to-X messages.

As a result, the control module obtains a result of the verification. It can therefore, in particular, be certain in the case of a positive result that it is a valid message, or it can no longer rely on the particular message in the case of a negative result.

Each check request preferably contains a particular identifier of the message to be verified. The particular message can therefore be unequivocally identified. Sending the particular message in full or sending a substantial part thereof can advantageously be dispensed with.

In addition, an aspect of the invention relates to a method for processing vehicle-to-X messages in a processing module and a control module, wherein the processing module carries out a method as described above with reference to a method to be carried out in a processing module, and wherein the control module carries out a method to be carried out as described above with reference to a method to be carried out in a control module. With regard to the particular methods in a processing module or in a control module, recourse can thereby be had to all of the embodiments and variants described. In particular, a particularly good interaction of the processing module and the control module can be achieved. It is understood that multiple control modules can typically be supplied with vehicle-to-X messages from a processing module. The method described here can therefore be correspondingly extended to multiple control modules or even to multiple processing modules which can work together accordingly in this case.

In addition, an aspect of the invention relates to a processing module which is configured to carry out a method as described above with reference to a method to be carried out in a processing module. In addition, the invention relates to a control module which is configured to carry out a method as described above with reference to a method to be carried out in a control module. With regard to the particular methods, recourse can be had to all of the embodiments and variants described herein.

In addition, the invention relates to a non-volatile computer-readable storage medium which contains program code, during the running of which by a processor a method according to the invention is carried out. Recourse can, in this case, be had to all of the embodiments and variants described herein.

Generally, it should be mentioned that a possible aspect of the invention can be seen, for example, in a system split. Vehicle-to-X messages are passed on, for example, from a processing module to a control module. At the same time, the processing module can temporarily store the messages in a buffer memory. If the control module requires verification of a message, it does not have to send back the entire message to the processing module for verification as in the case of previous systems, but only an identification or ID of the message. The processing module can find the message to be examined in the buffer memory on the basis of the ID, examine a security unit, and then send the result of the examination back to the control module. The messages are, in this case, always stored in their original form in the buffer memory in order to allow an examination.

The security part can be truncated from the message in order to transfer the messages between the two modules, since the control module does not have any use for this. This saves considerable bandwidth for the communication between the two modules.

In this case, an ID of the received message can be used directly as the identification or ID, reducing the hassle of double-entry accounting. However, a new ID can also be used, which is optimized to find the message again in the buffer memory as quickly as possible. Ideally, the messages passed along are reduced by means of pre-processing in the processing module. This can significantly reduce the number of messages stored in the buffer memory for a possible verification. The size of the buffer memory is typically selected depending on the reduction method, the types of applications (for example, based on event messages or on periodic messages), as well as the application logic (how old messages are still to be taken in account if at all).

In a preferred embodiment, the ID of the vehicle-to-X subscriber who has sent a corresponding message is also considered as the identification or identifier. On the basis of this information, the processing module can automatically classify all messages according to which have been received from the same subscriber. This embodiment is, in particular, useful when the algorithms used in the system perform calculations on the basis of objects instead of on individual messages.

In order to save computation time in the processing module, the ASN.1 decoding can, for example, only take place in the control module. The content of the ASN.1-coded part of the messages is not typically needed in the processing module, which is why this does not denote any restricting functionality. In the event of a very unequal number of received messages per unit of time, a check of the messages in the buffer memory can be performed in the event of suspicions, if there is still surplus computing power for verifications. In the event that such a previously examined message is then requested by the applications for examination, the latency can be significantly reduced until such time as an answer is received. Ideally, the examination status is additionally recorded regarding each message in the buffer memory for this suspicion-based check. Messages which are passed on to the control module as examined can typically be removed from the buffer memory, as the control module can now store the message as examined itself. Alternatively or additionally, the processing module can forward the result of each verification or suspicion-based check directly to the control module in order to reduce the latency even further in the event of a need for a check.

The suspicion-based check can be ideally optimized in that the control module provides feedback for every message received regarding the evaluation of how important this message is (for example "unimportant", "potentially important", "very important"). On the basis of this feedback the control module can sort the messages which have not yet been checked according to how critical they are to the verification. Therefore, only the messages notified as "very important" can be verified, for example, in the case of a large workload. In the case of a lower workload, the messages which have been classified as "potentially important" can also be examined or verified.

The communication between the two modules can be encrypted or at least secured to increase the security level. However, a public key infrastructure is not absolutely necessary for this; a symmetric encryption method such as AES is sufficient, which does not need to have any connection with the security system of the vehicle-to-X communication.

In a special variant, the functions are not split between different control units or modules, but between different partitions of control unit software or module software, which can be represented as virtually detached control units or modules. In this case, the communication between the partitions typically takes place via a virtual bus, for example inter-process communications ports. All of the other mechanisms described can be used identically.

As a result of the methodology described for security examination or verification in a distributed vehicle-to-X system, it is possible to house applications in already existing control units or modules, without the control units requiring corresponding security mechanisms. Vehicle-to-X including security on demand can very easily be integrated into existing vehicle architectures.

In particular, the advantage of splitting the functions among different partitions of a control unit or module is that the functions described can be integrated into different operating systems. The implementations of transceiver drivers, protocol stack and security libraries are frequently designed for systems similar to POSIX/Linux. On the other hand, the app calculation can be effected, for example, in an operating system similar to AUTOSAR, for example if an OEM wishes to integrate its own applications into the control unit or module. The invention described makes it possible to combine both worlds in one control unit or one module with the minimum outlay.

BRIEF DESCRIPTION OF THE DRAWINGS

The person skilled in the art will infer further features and advantages from the embodiment example which is described below with reference to the attached drawing, wherein:

FIG. 1 shows a vehicle which is configured to carry out a method according to the invention.

DETAILED DESCRIPTION OF THE PREFERRED EMBODIMENTS

FIG. 1 shows a vehicle 10 which is configured to carry out a method according to the invention in accordance with one possible embodiment example.

The vehicle 10 is, in this case, merely shown schematically. It comprises a left front wheel 20, a right front wheel 22, a left rear wheel 24 and a right rear wheel 26.

The vehicle 10 comprises a processing module 30. The processing module 30 is connected to an antenna 32 which is configured to receive vehicle-to-X messages. Thus, all vehicle-to-X messages which can be received in an area in which the vehicle 10 is located are received by the processing module 30.

The processing module 30 further comprises a buffer memory 34.

In addition, the vehicle 10 comprises a control module 40. This control module 40 is also merely shown schematically here and is configured to run one or more applications, for which vehicle-to-X messages are used. For example, this can be an autonomous driving function or collision avoidance. It is understood that the vehicle 10 can also comprise multiple control modules which can function accordingly.

As shown, the processing module 30 and the control module 40 are connected to one another in order to exchange data. In this case, the implemented functionality operates as described below.

In the case of an incoming vehicle-to-X message which is received via the antenna 32, pre-processing is performed first in order to find out whether the corresponding vehicle-to-X message can have any relevance at all to the vehicle 10. If it is a message which is discernibly irrelevant to the vehicle 10, it is immediately discarded.

The particular vehicle-to-X message is then saved in the buffer memory 34 and is also forwarded to the control module 40.

The control module 40 checks whether the vehicle-to-X message is so relevant to safety that immediate verification is required. If this is the case, it transfers a check request with an identification of the vehicle-to-X message back to the processing module 30. In this case, an ID of a vehicle-to-X message, which is typically already present in this message anyway, can in particular be used.

In response to the receipt of such a check request, the processing module 30 verifies the particular vehicle-to-X message stored in the buffer memory 34. It can emerge as a result that the vehicle-to-X message is either secure or insecure. This result is sent to the control module 40. The control module 40 therefore knows whether the particular vehicle-to-X message is secure and therefore trustworthy or not. For example, in the case of an insecure vehicle-to-X message, it is possible to dispense with using this for the purposes of autonomous vehicle control.

If, in the case of a vehicle-to-X message, verification is not required or at least not immediately required, the control module 40 sends back a particular piece of prioritization information regarding the vehicle-to-X message to the processing module 30. It is thereby indicated how important the control module 40 considers the particular vehicle-to-X message. In particular, a priority value can be indicated which is all the higher, the higher the probability is that a verification of this vehicle-to-X message will still be required.

If a processor load of a processor of the processing module 30 drops below a certain threshold, the processing module 30 verifies the vehicle-to-X messages stored in the buffer memory 34 independently of there actually being a check request for this. The verification is, in this case, carried out in accordance with a checking sequence which is specified on the basis of the prioritization information. If a check request should then come, the particular result of the verification is already available and can be sent directly to the control module 40.

Verified vehicle-to-X messages are typically deleted from the buffer memory 34, wherein storing the ID or identifier as well as the result of the verification is sufficient to retain the result of a verification. This can save significant amounts of memory space.

Compared with embodiments which are known from the prior art in which the complete vehicle-to-X message had to be sent back by the control module 40 to the processing module 30, considerable amounts of the necessary transmission capability between the processing module 30 and the control module 40 can be saved by the embodiment according to the invention according to the embodiment example shown.

In addition, as a result of the verification in accordance with the checking sequence it can be ensured, in the case of a low processor load, that any computing capacity which already exists is sensibly used in order to verify messages according to their relevance, so that the result is already available if required.

Generally, it should be noted that vehicle-to-X communication means, in particular, direct communication between vehicles and/or between vehicles and infrastructure facilities. For example, this can be vehicle to-vehicle communication or vehicle to-infrastructure communication. Inasmuch as reference is made to communication between vehicles within the framework of this application, this can in principle be effected, for example, within the framework of vehicle-to-vehicle communication which typically takes place without relaying via a mobile network or a similar external infrastructure and which should therefore be delimited from other solutions which build, for example, on a mobile network. Vehicle-to X communication can take place, for example, using the IEEE 802.11p or IEEE 1609.4 standards. Vehicle-to-X communication can also be designated C2X communication. The subareas can be referred to as C2C (car-to-car) or C2I (car-to-infrastructure). The invention does not, however, explicitly exclude vehicle-to-X communication with relaying, for example, via a mobile network.

The mentioned steps of the method according to the invention can be executed in the indicated order. However, they can also be executed in a different order. The method according to the invention can be executed in one of its embodiments, for example, with a specific set of steps in such a way that no further steps are executed. However, additional steps can in principle also be executed, including those which are not mentioned.

The claims associated with the application do not constitute a waiver of the attainment of more extensive protection.

If it emerges in the course of the process that a feature or a group of features is not absolutely necessary, the applicant is already striving now for a wording of at least one independent claim which no longer comprises the feature or group of features. This can be, for example, a sub-combination of a claim which exists on the date of filing or a sub-combination of a claim which exists on the date of filing, which is limited by additional features. Such claims needing to be reworded or combinations of features are to be understood to also be covered by the disclosure of this application.

It should further be noted that configurations, features and variants of the invention, which are described in the various embodiments or embodiment examples and/or which are shown in the FIGURES, can be combined in any way whatsoever with each other. Individual or multiple features can be exchanged with one another at will. Combinations of features resulting herefrom are to be understood to also be covered by the disclosure of this application.

References in the subordinate claims are not to be understood to constitute a waiver of the attainment of independent, objective protection for the features of the subordinate claims referring back to the principal claims. These features can also be combined at will with other features.

Features which are merely disclosed in the specification or features which are only disclosed in the specification or in a claim in conjunction with other features can, in principle, be of independent importance and essential to the invention. They can therefore also be individually incorporated into claims in order to delimit the invention from the prior art.

The invention claimed is:

1. A method for processing vehicle-to-X messages in a processing module, comprising:
   receiving a quantity of vehicle-to-X messages,
   storing the vehicle-to-X messages in a buffer memory,
   specifying a checking sequence for the vehicle-to-X messages, and
   performing a verification of the vehicle-to-X messages in accordance with the checking sequence.

2. The method according to claim 1,
wherein the checking sequence is specified on the basis of prioritization information.

3. The method according to claim 2, further comprising:
receiving a quantity of prioritization information for the stored vehicle-to-X messages from a control module.

4. The method according to claim 3, further comprising:
in response to the performance of a verification for a vehicle-to-X message, removing the vehicle-to-X message from the buffer memory and/or immediately sending a result of the verification to the control module.

5. The method according to claim 3, further comprising:
specifying of the prioritization information by the processing module.

6. The method according to claim 3, wherein the prioritization information indicates numerical and/or quantitative values for the vehicle-to-X messages.

7. The method according to claim 2, further comprising:
specifying of the prioritization information by the processing module.

8. The method according to claim 7, wherein the prioritization information indicates numerical and/or quantitative values for the vehicle-to-X messages.

9. The method according to claim 2,
wherein the prioritization information indicates numerical and/or quantitative priority values for the vehicle-to-X messages.

10. The method according to claim 1, further comprising:
forwarding the vehicle-to-X messages to at least one control module.

11. The method according to claim 10,
wherein the vehicle-to-X messages are forwarded without particular components to be detached.

12. The method according to claim 11, further comprising:
receiving a check request from the control module for at least one of the vehicle-to-X messages and, in response thereto, performing a verification of said vehicle-to-X message and sending a result of the verification to the control module.

13. The method according to claim 10, further comprising:
receiving a check request from the control module for at least one of the vehicle-to-X messages and, in response thereto, performing a verification of said vehicle-to-X message and sending a result of the verification to the control module.

14. The method according to claim 13,
wherein when a check request for a message which has already been verified is received a result of this verification is sent to the control module.

15. The method according to claim 14, wherein an identifier for identifying the vehicle-to-X message is saved for each message stored in the buffer memory, and wherein a particular check request contains a particular identifier for the vehicle-to-X message to be verified.

16. The method according to claim 13,
wherein an identifier for identifying the vehicle-to-X message is saved for each message stored in the buffer memory, and
wherein a particular check request contains a particular identifier for the vehicle-to-X message to be verified.

17. The method according to claim 1, further comprising:
performing pre-processing of the vehicle-to-X messages,
wherein depending on the pre-processing only a part of the vehicle-to-X messages is stored and/or sent.

18. The method according to claim 1 further comprising:
detecting a low system load of the processing module, wherein
the verification of stored vehicle-to-X messages is performed in response to the detection of a low system load.

19. A method for processing vehicle-to-X messages in a control module, comprising:
receiving a quantity of vehicle-to-X messages from a processing module, and
determining and sending the particular prioritization information for the vehicle-to-X messages to the processing module.

20. The method according to claim 19, further comprising:
determining for each of the vehicle-to-X messages whether the particular vehicle-to-X message is to be verified and, in response to the fact that a particular vehicle-to-X message is to be verified, sending a check request for this vehicle-to-X message to the processing module.

* * * * *